UNITED STATES PATENT OFFICE.

JOHN H. KELLOGG, OF BATTLE CREEK, MICHIGAN.

FOOD COMPOUND.

SPECIFICATION forming part of Letters Patent No. 567,901, dated September 15, 1896.

Application filed November 4, 1895. Serial No. 567,948. (No specimens.)

*To all whom it may concern:*

Be it known that I, JOHN H. KELLOGG, of Battle Creek, in the county of Calhoun and State of Michigan, have invented a new and Improved Alimentary Product, of which the following is a specification.

The object of my invention is to produce a new and superior article of food by the proper union or admixture of digested cereals and nuts in certain proportions.

In carrying out the invention the kernels of some form of edible nuts, preferably peanuts or almonds, are blanched and then thoroughly cooked, preferably by boiling in water for a period of four to six hours, after which they require to be dried. This cooked product is disintegrated by some suitable means, and preferably by passing it between rolls or rollers, and thus subjecting it to heavy pressure, whereby the mass is caused to separate into two products, one being a fine and comparatively dry and nearly white nutmeal, while the other is moist, pasty, adhesive, and brown, which for distinction is termed "butter" or "paste." The separation of the products is due to the adjustment of scrapers on the two opposed rolls, one scraper being set in contact with its roll and the other adjusted a slight distance from the other roll. The dry product or meal is removed by the first scraper. One or both of such nut products, the nutmeal or nut-butter, but preferably the former, is mixed with diastatically-digested starch of wheat, barley, oats, corn, or some analogous cereal.

The two products, the nutmeal and predigested starch or maltose, are mixed in about equal quantities by weight. Their intimate admixture is effected by any well-known method employed for mixing solid or viscid substances.

The final product is theoretically a complete food, since it is composed of completely-digested starch, completely-emulsified nut-oil, and nutmeal in the form of thoroughly-cooked and finely-divided proteids or vegetable casein and albumen. In other words, the sugar of the starch (preferably from wheat) is converted into maltose, the fat is perfectly emulsified, and the proteids are thoroughly cooked and finely divided and thus ready for immediate digestion and assimilation. The diastatic digestion of the starch gives it an emulsifying property, which is also possessed by some of the elements present in the nuts, so that when the two products are thoroughly incorporated together the oil of the nut is completely emulsified. This food product is very superior for the production of fat and blood, and is hence particularly valuable for anemic and emaciated persons. It is not only a predigested food, but it possesses peptogenic properties, whereby it aids digestion of other foods.

What I claim is—

An improved article of manufacture, the alimentary product composed of completely-digested starch, completely-emulsified vegetable oil such as described, and thoroughly-cooked and finely-divided vegetable proteids derived from nuts, as specified.

JOHN H. KELLOGG.

Witnesses:
 NEWTON K. SHELDEN,
 WILL. K. KELLOGG.